Oct. 5, 1943.　　　　E. J. ABBOTT　　　　2,330,801
TRACER MECHANISM FOR INVESTIGATING SURFACE IRREGULARITIES
Filed Dec. 26, 1939　　　2 Sheets-Sheet 1

INVENTOR
E. J. ABBOTT
BY Roy A. Plant
ATTORNEY

Oct. 5, 1943.  E. J. ABBOTT  2,330,801
TRACER MECHANISM FOR INVESTIGATING SURFACE IRREGULARITIES
Filed Dec. 26, 1939   2 Sheets-Sheet 2

INVENTOR
E. J. ABBOTT.
BY Roy A. Plant
ATTORNEY

Patented Oct. 5, 1943

2,330,801

UNITED STATES PATENT OFFICE 2,330,801

TRACER MECHANISM FOR INVESTIGATING SURFACE IRREGULARITIES

Ernest J. Abbott, Ann Arbor, Mich., assignor to Physicists Research Company, Ann Arbor, Mich.

Application December 26, 1939, Serial No. 310,899

10 Claims. (Cl. 73—51)

The present invention relates broadly to tracers and measuring apparatus, and in its specific phases to a tracer mechanism adapted for application to and movement over a surface whose roughness is to be investigated.

The surface of solid objects, and especially that of all machined or ground finish articles is, in general, composed of a series of ridges and grooves, and these in turn may be modified by waves, scratches, chatter marks, and chipping under machining conditions. These surface irregularities, or roughness, bear an important relation to wear, lubrication, appearance, and other factors affecting the usefulness of the surface. Up to the time I produced the surface roughness measuring instrument now known as the "Profilometer," the quality of machined, ground, or polished surfaces, had been commonly determined or classified by drawing one's finger nail across the specimen, or through direct visual examination made by various persons having more or less experience in this field. The human element thus entering made the results obtained by various observers non-comparable, since what would be a good finish to one man would be excellent or poor to another due to the lact of fixed uniform standards of comparison.

Experience has shown that the vertical height of the surface irregularities forms the basis for the most useful roughness rating, and for practical application in English speaking countries, this value should be expressed directly in inches. I have also found that the individual peaks and valleys of roughness are seldom of importance. The practical rating of roughness is the average height of the peaks and valleys taken over an eighth of an inch or more of surface profile. On most surfaces, such as average includes several hundred irregularities. In view of this, a practical roughness metering device must have a tracer unit with a vertically movable member which has a tracer point fine enough to "bottom" the principal irregularities without damage to the specimen, and means must be provided to determine automatically the average height of these irregularities at a reasonable speed of trace with the tracer unit, and to indicate this average value.

The sharp point called the "tracer point" in my invention is constrained to move in a direction perpendicular to the normal surface of the specimen, and is held in contact with the surface of the specimen by resilient means. Motion of the tracer assembly, containing the tracer point, relative to the specimen is provided in a direction parallel to the nominal surface, so that the displacements of the tracer point in a direction substantially perpendicular to the nominal surface of the specimen are a measure of the height of the surface irregularities. The direction perpendicular to the nominal surface is called "vertical," although obviously the specimen and the tracer assembly may have any orientation with respect to the earth without affecting their action. The displacements of the tracer point, and hence, the roughness of the surface, may be shown and measured by a suitable electronic means such as is set forth in my co-pending patent application which will be hereinafter referred to.

In my co-pending patent application filed September 9, 1936 and carrying Ser. No. 100,030, (Patent No. 2,240,278), I have disclosed equipment for measuring the dimensions of surface irregularities. This equipment consists of a tracer mechanism having a tracer point which is drawn across the surface to be measured, and an electronic means for measuring the motions of this tracer point which has tip dimensions such that it is capable of "bottoming" the surface irregularities which it is desired to measure. The tracer mechanism designs shown in my co-pending patent application are all of the laboratory or permanent type of set-up construction. Most of them are sensitive to extraneous vibration and are of specialized construction so that they can be used with only a limited size or shape of specimen. A great deal of skill is also required to adjust and operate these devices. These shortcomings and limited application adaptability of the specific tracer assembly apparatus of my prior invention showed the necessity of developing an improved tracer assembly adapted for a wide range of use such as is involved in the measuring of surface roughness of a great variety of objects under production shop conditions.

Accordingly, among the objects of the present invention is the provision of a tracer assembly readily adaptable to a wide variety of sizes and shapes of specimens, including internal diameters, external diameters, flat surfaces, and curved surfaces of regular and irregular form.

Another object is to provide a tracer assembly having a wide range of capacity adapting it to measure finely ground and polished surfaces, the roughness of which are only a few millionths of an inch in height, and immediately after be used on rough bored or turned surfaces which may be hundreds of times as rough.

Another object is to provide a tracer assembly which is not affected by extraneous vibrations of the specimen itself, or of the bench or machine on which the work is supported, nor of surrounding objects. Under shop conditions, these extraneous vibrations are often many times the size of the irregularities being measured.

Another object is to provide a tracer assembly which may be readily used on different jobs either under mechanical or manual movement relative to the specimen, the manual movement preferably being used in most instances in order to avoid slow and costly set-ups.

A still further object is to provide a tracer assembly which is sufficiently rugged to withstand shop use, maintain its calibration over long periods, and is simple to adjust and operate, thus facilitating its use by ordinary mechanics.

Further objects and advantages of the invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but several of various ways in which the principle of the invention may be used.

Figure 2:
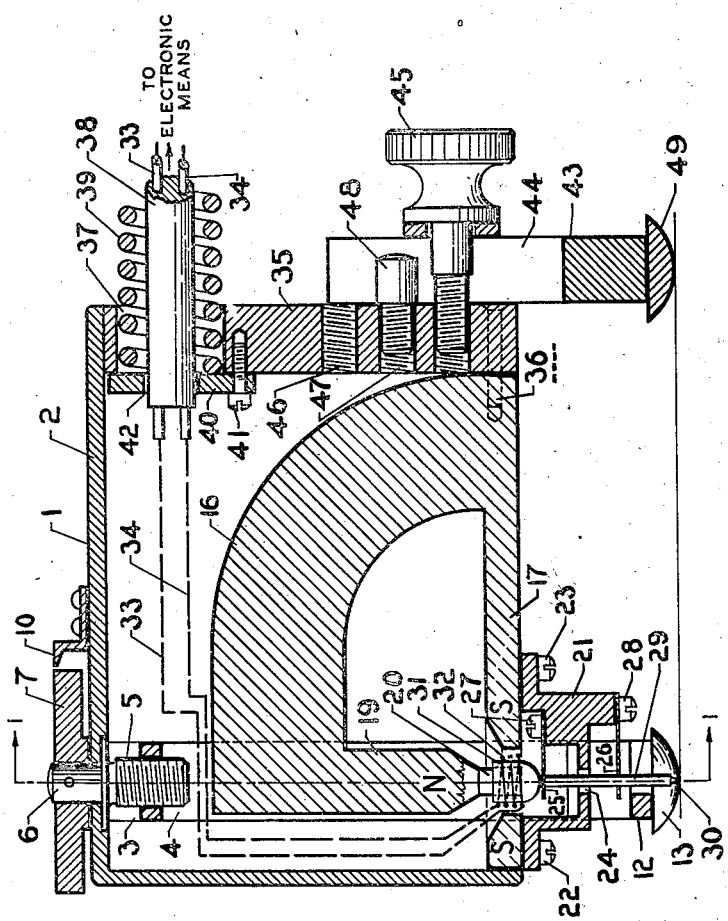
Figure 2 shows a vertical sectional assembly of one form of the present invention as viewed along the line 2—2 of Figures 1, 3, and 5.
Figure 1:
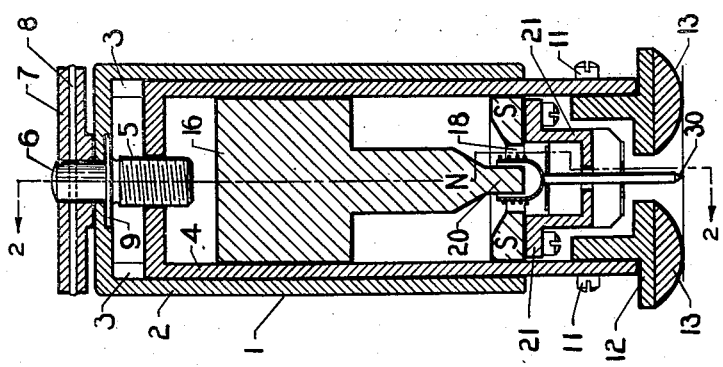
Figure 1 shows a vertical sectional assembly of a preferred form of the present invention as viewed along the line 1—1 of Figures 2, 3, and 6.
Figure 3:
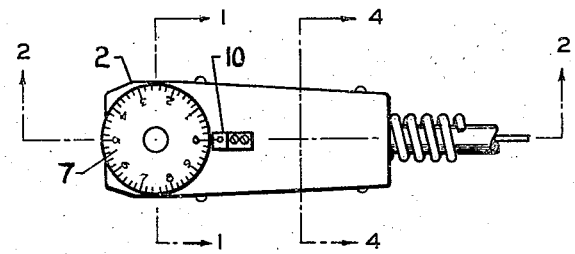
Figure 3 shows a top view of the assembly shown in Figures 1 and 2.

Referring to Figures 1 and 2, the tracer assembly 1 is provided with a case 2 of non-magnetic material to avoid short circuiting of magnetic flux. For convenience, the case 2, which also acts as the frame of the assembly, is preferably made of brass or a zinc alloy die-casting. The casing is provided with ways 3 in which vertical slide member 4 is adapted to be moved upon rotation of threaded member 5 which engages corresponding threads in the slide member. The upper end of the threaded member 5 is provided with an upwardly projecting shaft 6 which passes through a suitable opening in the top of the case 2. A graduated knob 7 is mounted on shaft 6 and anchored in place above case 2 by means of pin 8 or the equivalent. An abutment member 9 is mounted on shaft 6 within the case in manner such that after graduated knob 7 is fastened in place, shaft 6 with its depending threaded portion 5 will be free from endwise motion, and yet be readily rotatable for adjustment purposes, as will be hereinafter set forth. An index 10 is preferably used in connection with graduated knob 7 as an aid to adjustment of the device. The lower ends of the vertical slide member extend through the bottom of the case 2 and have openings, which may be in the form of vertical slots, for the reception of screws 11 which engage, and when tightened in place hold the yoke 12 which carries curved skids 13.

Mounted within the case 2 and held in place by means of screws 14 and 15 is a permanent magnet 16. This permanent magnet has an extending arm 17 the free end of which forms the south pole of the magnet. This extending arm 17 has an opening 18 therethrough, which is preferably beveled on its upper edge. The permanent magnet 16 also has a depending arm 19 the free end of which acts as the north pole of the magnet. The lower end 20 of this depending arm is considerably smaller than opening 18 and extends approximately centrally thereinto to the lower edge of extending arm 17. Depending arm 19 is also tapered, as it approaches the lower end portion 20 thereof which is relatively straight sided. Construction in this manner causes lines of magnetic flux to be more concentrated directly between poles in the area of the south pole below the tapered upper edge of opening 18. I do not wish to be limited to the specific polarity noted, since obviously this could be reversed without effecting the invention.

A mounting member 21 of non-magnetic material is preferably fastened to the under face of extending arm 17 by means of screws 22 and 23. Opening 24 through mounting member 21 is located directly below the north pole depending arm 19 of the permanent magnet and with a center line corresponding with the vertical center line through lower end 20 of depending arm 19. Springs 25 and 26 are suitably fastened to mounting member 21, for instance, by means of screws 27 and 28. Suitably mounted on springs 25 and 26 is a non-magnetic rod 29 carrying a tracer point 30 on its lower end. Movement of the vertical slide member 4 provides the necessary adjustment of spring tension which holds the tracer point in contact with the surface being investigated. In order to "bottom" the fine irregularities which constitute the normal roughness of many surfaces to be investigated, the lowermost tip of this tracer point must be of a size smaller than .001" radius and is preferably rounded smoothly to prevent scratching. I do not wish however to be limited to this specific size of tracer point tip since obviously the particular size of the tip to be used will be chosen in view of the particular type of surface to be investigated. The upper end of tracer point holding rod 29 is provided with an upwardly opening cup-shaped member 31 of non-magnetic material. This cup-shaped member is adapted to receive the lower end 20 of depending arm 19 of the permanent magnet 16 therein and yet to move freely in a vertical direction relative to said lower end 20. On the outer face of cup-shaped member 31 and in the space between same and the vertical portion of opening 18 in the south pole extending arm 17 is wound a coil 32. This type of coil and magnet construction gives a wide range of capacity, since the coil moves in an essentially constant magnetic field throughout the desired range of its vertical displacements under the influence of the moving tracer point. Lead wires 33 and 34 connect this coil to a suitable electronic means (not shown) for indicating movements of the tracer point 30. In order to suppress detrimental inertia effects, the cup-shaped member 31 is preferably formed from an alloy of aluminum, and rod 29 is made hollow throughout most of its length.

Back plate 35 (Figure 2), which is preferably formed from a non-magnetic material such as brass to reduce short circuiting of magnetism, is fastened to permanent magnet 16, for instance, by means of screws 36 so as to move in unison therewith when the permanent magnet assembly is removed from case 2. At the upper edge of back plate 35 is provided a passageway 37 adapted to receive cable 38 carrying lead wires 33 and 34 and a conventional short length of protecting spring 39. A clamp plate 40 (Figures 2 and 4) anchored to the inner face of back plate 35 by means of a screw 41 is provided to clamp the cable 38 in conventional manner at passageway 42. If desired, the protecting spring 39 may be joined to clamp plate 40 by welding, or the like.

Figure 11:
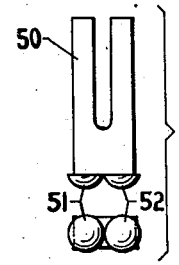
Figure 11 shows a front and bottom view of an adjustable rear foot with double skids.

Rear foot 43 (Figure 2), which is provided with vertical slot 44 for ease of adjustment, is adjustably anchored to back plate 35 by means of a threaded stud 45. Threaded openings 46 and 47 are provided in back plate 35 for the reception of a guide plug 48 which acts to hold rear foot 43 in upright position. The lower end of rear foot 43 is equipped with a skid 49. Under conditions of use the skids 13 and 49 normally act to support the tracer assembly 1 on the specimen being investigated. In order to insure maximum accuracy of readings, rod 29 carrying tracer point 30 should stand perpendicular to the surface being investigated. The making of rear foot 43 adjustable facilitates the operation of the tracer assembly in this manner. For most purposes, a rear foot 43 with a single skid 49 is sufficient. However, where measurements are to be made longitudinally of the surface of a cylinder, the single skid of the rear foot tends to slide sideways and thus affects the convenience of operation of the tracer assembly. In order to facilitate the taking of measurements on a surface of this nature, rear foot 50 (Figure 11) with a pair of skids 51 and 52 is preferably used in the place of rear foot 43.

Figure 5:
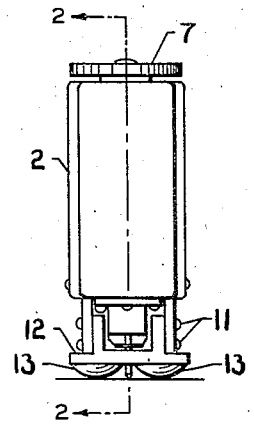
Figure 5 shows the assembly of Figures 3 and 6 as viewed from the left end thereof and omitting the rear foot assembly for clarity of illustration.
Figure 6:
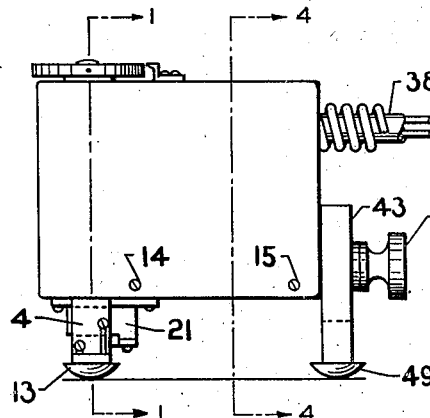
Figure 6 shows the assembly of Figure 5 as viewed from the right side thereof.
Figure 7:
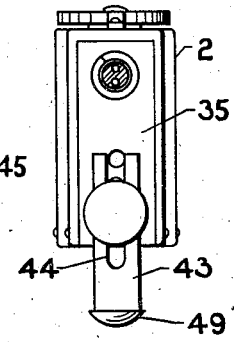
Figure 7 shows the assembly of Figures 3 and 6 as viewed from the right end thereof, and for clarity of illustration all of the lower parts except the rear foot assembly have been omitted.
Figure 8:
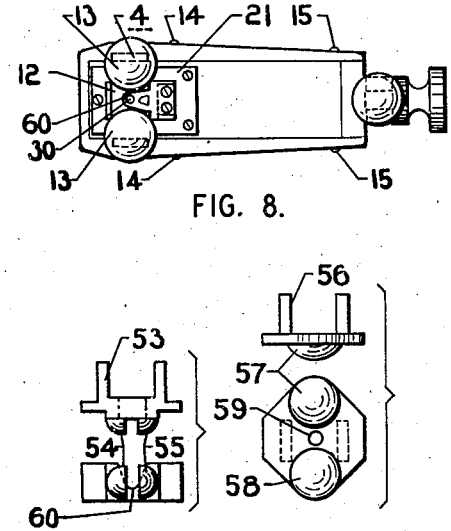
Figure 8 shows a bottom view of the assembly of Figure 6.
Figures 4, 9, 10:
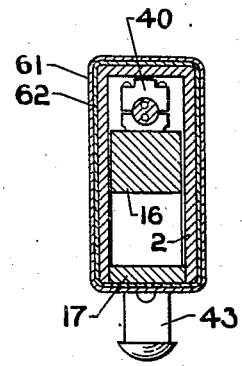
Figure 4 shows a vertical section of a modified form of the present invention as viewed along a line corresponding to line 4—4 of Figures 3 and 6.
Figure 9 shows a front and bottom view of a modified form of skid-carrying yoke assembly adapted for use in the measurement of roughness of small inside diameter passageways or grooves.
Figure 10 shows a front and bottom view of a modified form of skid-carrying yoke assembly adapted for use under conditions where it is desirable to move the tracer assembly in a sidewise direction for measurement of surface roughness.

Instead of using yoke 12 with skids 13, (Figures 5 and 6) various other constructions of this assembly may be used, depending upon the particular type of surface to be investigated. For instance, where the inner surface of a passageway as small as a half inch in diameter is to be investigated with the specimen cut open. yoke 53 (Figure 9) with skids 54 and 55 may be used. On the other hand, where surface measurements are to be made under conditions requiring sidewise movement of the tracer assembly, a yoke 56 (Figure 10) having skids 57 and 58 is preferably used. This skid is provided with an opening 59 on the center line of the skids 57 and 58 to permit rod 29 with its tracer point 30 to pass therethrough. The cut-away portion 60 of yokes 12 and 53 (Figures 8 and 9) acts in similar manner to permit the tracer point 30 to lie on a line joining the crown of skids 13 and 13 (Figure 8) or 54 and 55 (Figure 9).

Mounting the tracer point 30 so that it lies in the vertical plane through the points at which the skids 13 contact the specimen presents the advantage of making the tension on the tracer tip independent of small changes of adjustment due to pivotal motion in a vertical plane on the front skids. Construction in this manner also acts to give the fine tracer point 30 maximum protection from accidental injury. This arrangement of the tracer point and skids additionally provides effective freedom of the tracer point assembly from extraneous vibrations, even under severe conditions, thus further insuring the accuracy of the readings obtained and making it possible to use the instrument under typical shop conditions.

The mounting of coil 32 so that it moves in unison with rod 29 under the influence of tracer point 30, as same is moved over the surface being investigated, causes this coil to cut lines of magnetic flux between the poles of the permanent magnet 16 with resultant generation of an electric voltage in the coil. The greater the movement of the coil, the greater the voltage produced, and such voltage may be amplified in a suitable electronic means such as I have described in my co-pending application, Ser. No. 100,030 so as to indicate directly on a suitable meter or the like (not shown) the roughness of a surface being investigated. Movement of the tracer assembly over the surface being investigated at speeds as high as one inch per second has been found entirely satisfactory in determining the roughness of the surface with apparatus of the type described herein.

In adjusting the vertical position of the skids adjacent the tracer point, it is essential that the adjustment be made within close limits and be suitable for the curvature of the particular specimen being measured. If the skids project too far, the end or tip of the tracer point will fail to touch the surface and the tracer will not operate. On the other hand, if the skids are withdrawn too far, the tracer point will extend so that there is danger of its scratching the surface of the specimen, and in extreme cases, the tracer point may be broken. The proper adjustment of the skids may be readily made as follows: With the skids extended so that the tip of the tracer point does not touch the surface, the tracer assembly is rocked from side to side as the skids are slowly withdrawn by turning the knob 7 on the top of the tracer assembly 1. At first there is no movement of the tracer coil with respect to the magnet, and hence no voltage is generated in the coil so as to be indicated on the suitable associated electronic equipment. However, when the skids are withdrawn so that rocking the tracer brings the tracer point lightly in contact with the surface, there is a sudden "kick" of voltage due to the movement of the coil, and the skids can then be very nicely adjusted by noting where this "kick" first occurs. A micrometer adjustment of the knob 7 allows movement of the skids so as to cause a suitable initial deflection of the springs 25 and 26 which support the rod carrying the tracer point when the latter and the skids rest on the surface to be investigated. I have found that an initial deflection of the order of .0002" is suitable for ordinary work.

The combination of adjustment of vertical slide member 4 and the skids which move in unison therewith, as well as the rear foot and skid assembly, plus interchangeable front skid assemblies and rear skid assemblies, provides rapid accommodation of the tracer assembly for use on external diameters from less than 1/8" up to infinity, flat surfaces, and internal diameters down to 1/16" or even less. The limits thus expressed include most practical surfaces to be investigated.

The radius of the skids, which are preferably in the form of sectors of spherical surfaces, is preferably made so large compared with the tip of the tracer that they glide over the finely spaced irregularities which constitute the roughness of the surface. A convenient form of the skids 13 and 49 is a sector of a sphere having a quarter inch radius. Even if the skids penetrate the irregularities slightly, the error is negligible. I have found that these motions add by the well-known square law so that as long as the motion of the skids does not exceed 1/4 of that of the tracer point, the resultant error is less than 3% which is negligible in this type of measurement. On very long waves of the order of 1" radius, the skids follow the curvature and thus enable one to measure the finely-spaced roughness on such wavy surfaces without the readings being influenced by the waves or surface curvature.

The skids in addition to functioning to provide a reference surface, relative to which the tracer point moves, also act to support the tracer assembly mechanically and any friction which they produce with the surface being measured makes the operation of the tracer more difficult. Also, friction causes wear, and when the spherical surface of the skids has been worn away, they tend to "grab" and make uniform motion of the tracer assembly more difficult. Hardened steel skids fastened directly to the yokes and rear foot units are fairly satisfactory as far as wear is concerned, but in operation there are some surfaces against which the steel skids do not slide with desired smoothness. The material found to be most satisfactory for general use is cemented carbide of the "bland" type now coming into extensive use as a material from which plug gages or the like are made. This material has the double advantage of being very hard and being capable of taking a high polish. Its wearing qualities are second only to those of the diamond.

Under operating conditions it is frequently necessary to use the tracer assembly at points where extraneous magnetic and electric fields produced by nearby electric transformers, motors, generators, power lines or other electrical equipment are present. These extraneous fields may be "picked up" by the coil 32 or associated electric circuits in the tracer assembly and thus introduce errors into the readings obtained through the use of said tracer assembly. I have found that these errors can be greatly reduced by placing one or more layers of magnetic shielding material 61 and 62 (Figure 4) around the tracer assembly. High permeability iron alloys may be satisfactorily used as this magnetic shielding material. In order to prevent direct short circuiting of the magnetic flux of magnet 16, the magnetic shielding material is separated from the upper part of said magnet by a layer of non-magnetic material which preferably should be one sixteenth of an inch or more in thickness. The case 2 of the tracer assembly is normally used for this purpose.

Other modes of applying the principle of my invention may be employed instead of those explained, change being made as regards the mechanism herein disclosed, provided the means stated by any of the following claims or the equivalent of such stated means be employed.

I therefore particularly point out and distinctly claim as my invention:

1. In a mechanism of the character described, the combination which comprises a frame, a tracer point, a holder for said tracer point, means including a resilient means for positively joining said tracer point holder to said frame so as to permit said tracer point holder to move back and forth in an endwise direction, supporting means adjacent said tracer point, and a handle including means for positively adjusting said tracer point and supporting means relative to each other in a direction substantially parallel to the endwise movement direction of said tracer point holder, the operation of the handle of said adjusting means causing said relative movement.

2. In a mechanism of the character described, the combination which comprises a frame, a tracer point, a holder for said tracer point, a mounting means carried by said frame, a resilient means for positively connecting said tracer point holder to said mounting means for resiliently holding said tracer point in place and controlling the direction of its movement, supporting means adjacent said tracer point, means for guiding said supporting means and limiting same to movement relative to said frame in a direction substantially parallel to the direction of movement of said tracer point as permitted by said resilient means, and means connected to said guiding means for said supporting means for positively moving same in either direction substantially parallel to the direction of movement of said tracer point when said supporting means is at a point between its movement limits.

3. In a mechanism of the character described, the combination which comprises a frame, a tracer point, a holder for said tracer point, a supporting means carried by said frame, a resilient means connecting said tracer point holder to said supporting means for resiliently holding said tracer point in place and controlling the direction of its movement, skids adjacent said tracer point, carrier means for said skids, mechanical means having a handle for adjusting said tracer point and skids relative to each other in a direction substantially parallel to the direction of movement of said tracer point as permitted by said resilient means, the operation of the handle of said adjusting means causing said relative motion, and means carried by said frame and having mounted thereon at least one skid at a point remote from said skids adjacent the tracer point, all of said skids being adapted for simultaneous use in supporting said mechanism with said tracer point movable substantially perpendicular to the plane tangent to the supporting faces of all of said skids.

4. In a mechanism of the character described, the combination which comprises a frame, a tracer point, a holder for said tracer point, a supporting means carried by said frame, a resilient means connecting said tracer point holder to said supporting means for resiliently holding said tracer point in place and controlling the direction of its movement, a pair of skids adjacent and on opposite sides of said tracer point, a handle including means for adjusting said tracer point and skids relative to each other in a direction substantially parallel to the direction of movement of said tracer point as permitted by said resilient means, the operation of the handle of said adjusting means causing said relative motion, and means for translating the motion of said tracer point into electrical voltage.

5. In a mechanism of the character described for use in determining surface irregularity dimensions, the combination which comprises a frame, a tracer point, a holder for said tracer point, a supporting means carried by said frame, a resilient means connecting said tracer point holder to said supporting means for resiliently holding said tracer point in place and controlling the direction of its movement, skids adjacent said tracer point, carrier means on which said skids are mounted, means including ways for slidably mounting said carrier means on said frame, handle means for adjusting said tracer point and carrier means mounted skids relative to each other in a direction substantially parallel to the direction of movement of said tracer point as permitted by said resilient means, the operation of the handle of said adjusting means causing said relative motion, said skids adjacent said tracer point being adapted for use in supporting the tracer point portion of said mechanism with said tracer point between same and movable substantially perpendicular to said surface whose dimensional irregularities are to be determined, and a magnet and coil means for translating the motion of said tracer point into electrical voltage.

6. In a tracer mechanism adapted for movement in contact with the surface of a specimen to be investigated, the combination which comprises a frame, a tracer point, an elongated holder having said tracer point mounted on one end thereof, a supporting means carried by said frame, spring means connecting said tracer point holder to said supporting means for resiliently holding said tracer point in place and controlling the direction of its movement, skids adjacent said tracer point, carrier means on which said skids are mounted, a handle including means for adjusting said tracer point and carrier means mounted skids relative to each other in a direction substantially parallel to the direction of movement of said tracer point as permitted by said spring means, the movement of said handle including means causing said relative motion, said skids being adapted for use in supporting said mechanism with said tracer point between same and movable substantially perpendicular to a plane tangent to the supporting faces of said skids, and means for translating the motion of said tracer point into electrical voltage.

7. In a tracer mechanism adapted for movement in contact with the surface of a specimen to be investigated, the combination which comprises a frame, a tracer point, an elongated holder having said tracer point mounted on one end thereof, a supporting means carried by said frame, spring means connecting said tracer point holder to said supporting means for resiliently holding said tracer point in place and controlling the direction of its movement, cemented carbide skids adjacent said tracer point, threaded means for adjusting said tracer point and skids relative to each other in a direction substantially parallel to the direction of movement of said tracer point as permitted by said spring means, said adjusting means causing said relative motion, said skids being adapted for use in supporting said mechanism with said tracer point between same and movable substantially perpendicular to a plane tangent to the supporting faces of said skids, and means for translating the motion of said tracer point into electrical voltage.

8. A tracer mechanism adapted for movement on the surface of a specimen to be investigated, which consists of a non-magnetic frame, a tracer point, an elongated holder having said tracer point mounted on one end thereof, a permanent magnet carried within said frame, a supporting means mounted below said magnet for movement in unison therewith, a pair of substantially parallel spaced-apart springs connecting said tracer point holder to said supporting means for resiliently holding said tracer point in place and controlling the direction of its movement, a pair of skids adjacent but on opposite sides of said tracer point, a yoke carrying said skids and provided with an opening between same for the free passage of said tracer point holder therethrough, a member slidably engaging suitable ways in said frame and extending below said frame and alongside the poles of said magnet, means for removably joining said skid carrying yoke to the lower end of said slidable member, means for joining the upper end of said slidable member to said frame, said joining means being threaded and adapted upon rotation to move said slidable member endwise relative to said frame, a rear foot, means for joining said rear foot to said frame at the end thereof removed from said slidable member and with said rear foot extending below said frame, said joining means also including means for endwise adjustment of said rear foot, at least one skid on the lower end of said rear foot, the lower face of each of said skids lying on a plane below said frame and skid carrying members, said elongated holder for the tracer point lying substantially in a plane including the point of contact of each of said skids adjacent but on opposite sides of said tracer point, said last-named plane being substantially perpendicular to said first-named plane, a coil mounted on the upper end of said tracer point holder and within the magnetic field between the north and south poles of said magnet so that motion of said tracer point will cause the generation of electricity in said coil, and means for conducting the electricity generated to a point of use.

9. A tracer mechanism adapted for movement on the surface of a specimen to be investigated, which comprises a frame assembly, a tracer point, a holder for said tracer point, a supporting means carried by said frame assembly, resilient means for connecting said tracer point holder to said supporting means for resiliently holding said tracer point in place and controlling the direction of its movement, a member slidably engaging said frame for guided movement adjacent said tracer point holder and substantially in the same direction as the movement of the latter relative to said frame under operating conditions, means for joining said slidable member to said frame, said joining means comprising a threaded member adapted upon rotation of same to move said slidable member on said frame, a removable yoke on said slidable member at the end thereof adjacent said tracer point, and a pair of skids on said yoke, said skids being at opposite sides of said tracer point and having rounded faces lying on a plane substantially perpendicular to the path of movement of said tracer point.

10. A tracer mechanism adapted for movement on the surface of a specimen to be investigated, which comprises a frame assembly, a tracer point, a holder for said tracer point, a supporting means carried by said frame assembly, resilient means for connecting said tracer point holder to said supporting means for resiliently holding said tracer point in place and controlling the direction of its movement, a member slidably engaging said frame for guided movement adjacent said tracer point holder and substantially in the same direction as the movement of the latter relative to said frame under operation conditions, means for joining said slidable member to said frame, said joining means comprising a threaded screw adapted to engage a suitable threaded portion of said slidable member and, upon rotation of said screw, to move said slidable member on said frame, a yoke, means for removably mounting said yoke on said slidable member at the end thereof adjacent said tracer point, a pair of skids on said yoke, said skids being at opposite sides of said tracer point and having rounded faces lying on a plane substantially perpendicular to the path of movement of said tracer point, means operated through the movement of said tracer point and tracer point holder to convert motion of said tracer point into electrical voltage, and means for conducting the electricity so generated to a point of use.

ERNEST J. ABBOTT.

CERTIFICATE OF CORRECTION.

Patent No. 2,330,801.   October 5, 1943.

ERNEST J. ABBOTT.

It is hereby certified that error appears in the printed specification of the above numbered patent requiring correction as follows: Page 1, first column, line 51, for "normal" read --nominal--; page 5, second column, line 39, claim 8, for "side sof" read --sides of--; line 52-53, claim 9, for "supportilng" read --supporting--; page 6, first column, line 11, claim 10, for "operation" read --operating--; and that the said Letters Patent should be read with this correction therein that the same may conform to the record of the case in the Patent Office.

Signed and sealed this 4th day of January, A. D. 1944.

(Seal)

Henry Van Arsdale,
Acting Commissioner of Patents.